(12) United States Patent
Ueda et al.

(10) Patent No.: US 9,682,452 B2
(45) Date of Patent: Jun. 20, 2017

(54) DAMPING APPARATUS

(71) Applicant: DMG MORI CO., LTD., Nara (JP)

(72) Inventors: Toshio Ueda, Nara (JP); Takafumi Ochiai, Nara (JP)

(73) Assignee: DMG MORI CO., LTD., Nara (JP)

( * ) Notice: Subject to any disclaimer, the term of this patent is extended or adjusted under 35 U.S.C. 154(b) by 0 days.

(21) Appl. No.: 15/004,290

(22) Filed: Jan. 22, 2016

(65) Prior Publication Data
US 2016/0214222 A1  Jul. 28, 2016

(30) Foreign Application Priority Data

Jan. 23, 2015 (JP) ................................. 2015-010905

(51) Int. Cl.
*B23Q 1/76* (2006.01)
*B23Q 11/00* (2006.01)
*F16F 15/08* (2006.01)

(52) U.S. Cl.
CPC .......... *B23Q 1/763* (2013.01); *B23Q 11/0032* (2013.01); *F16F 15/08* (2013.01)

(58) Field of Classification Search
CPC ..... B23Q 1/763; B23Q 11/0032; F16F 15/08; F16F 15/021
USPC ............................ 188/381; 82/162, 163, 164
See application file for complete search history.

(56) References Cited

U.S. PATENT DOCUMENTS 4,416,174 A * 11/1983 Owsen ..................... B23Q 1/76
  451/408
4,530,507 A *  7/1985 Lee, Jr. ............. B23B 31/16275
  279/123
4,546,681 A * 10/1985 Owsen ..................... B23Q 1/76
  294/116
4,754,673 A *  7/1988 Hiestand .................. B23Q 1/76
  82/162
5,347,897 A *  9/1994 Rouleau .............. B23B 31/1269
  82/127

(Continued)

FOREIGN PATENT DOCUMENTS

JP       62074505 A  *  4/1987
JP       04217403 A  *  8/1992

(Continued)

OTHER PUBLICATIONS

Machine translation in English for JP 62-74505A; Inventor: Ito et al.; 3 pages; Retrieve Date: Dec. 22, 2016.*

(Continued)

*Primary Examiner* — Thomas J Williams
*Assistant Examiner* — Mariano Sy
(74) *Attorney, Agent, or Firm* — Miller, Matthias & Hull LLP

(57) ABSTRACT

A damping apparatus includes a contact roller provided to be rotatable about a rotation axis, a first support body by which the contact roller is rotatably supported, a second support body holding the first support body so that the rotation axis of the contact roller is parallel to an axis of a spindle, a drive mechanism driving the second support body to bring the contact roller into contact with a workpiece held by the spindle and to separate the contact roller from the workpiece, and a base supporting the second support body and the drive mechanism. The first support body is held by the second support body via an elastic rubber body.

2 Claims, 4 Drawing Sheets

(56) References Cited

U.S. PATENT DOCUMENTS

| | | | | |
|---|---|---|---|---|
| 2004/0194593 A1* | 10/2004 | Siegwart | ............... | B23Q 1/76 82/162 |
| 2004/0237734 A1* | 12/2004 | Lessway | ............... | B23Q 1/763 82/163 |
| 2008/0139092 A1* | 6/2008 | Lessway | ............... | B23Q 1/76 451/408 |
| 2010/0288089 A1* | 11/2010 | Miyamoto | ............... | B23B 5/08 82/118 |
| 2011/0209591 A1* | 9/2011 | Helm | ............... | B23Q 1/76 82/162 |

FOREIGN PATENT DOCUMENTS

| | | |
|---|---|---|
| JP | 2000-317756 A | 11/2000 |
| JP | 2004-181587 A | 7/2004 |

OTHER PUBLICATIONS

Machine translation in English for JP 4-217403A; Inventor: Saiki; 4 pages; Retrieve Date: Dec. 22, 2016.*

* cited by examiner

DAMPING APPARATUS

BACKGROUND

Field of the Disclosure

The present disclosure relates to a damping apparatus disposed on a machine tool for reducing vibration of a workpiece held by a spindle of the machine tool for machining.

Background of the Disclosure

Although its main purpose is not vibration reduction, there has been known a center rest that supports an elongated workpiece held by a spindle of a machine tool for machining to reduce run-out of the workpiece (see Japanese Unexamined Patent Application Publication No. 2000-317756 and Japanese Unexamined Patent Application Publication No. 2004-181587).

Both of the center rests disclosed in Japanese Unexamined Patent Application Publication No. 2000-317756 and Japanese Unexamined Patent Application Publication No. 2004-181587 have two sets of two rotating rollers, i.e., four rotating rollers in total, arranged symmetrically with respect to the spindle axis, and have a configuration in which a workpiece is sandwiched and held by the four rotating rollers. Each of the rotating rollers is held by an appropriate support body to be rotatable about an axis parallel to the spindle axis and is supported by the support body to be movable in directions toward and away from the spindle axis, and at least two of the rotating rollers are biased toward the workpiece by a spring body so that the workpiece is sandwiched and held between the rotating rollers and the other rotating rollers.

Thus, according to such a center rest, an elongated workpiece, which is held by a spindle at one end thereof, is held by the center rest at the other end thereof, whereby run-out of the other end of the workpiece is reduced.

Further, since such a center rest has a configuration in which the rotating rollers are biased toward the workpiece by a spring body, when vibration occurs on the workpiece during machining, the rotating rollers vibrate themselves in response to the vibration propagated thereto so as to absorb and consume energy of the vibration, thereby damping the vibration. Therefore, it is conceivable that this center rest is capable of reducing vibration of the workpiece to some extent.

SUMMARY OF THE DISCLOSURE

By the way, in machining using a machine tool, if vibration, particularly chatter vibration, occurs on a workpiece, the workpiece will be a defective product. Moreover, if the frequency of the chatter vibration is equal to or close to the natural frequency of the machine tool, the machine tool will resonate with it and such a state is very undesirable. Therefore, in a case where vibration occurs during machining, it is preferable that the vibration is certainly damped and suppressed.

However, in the above-described conventional center rest, since the rotating rollers are movable only in one direction, i.e., the direction in which they are biased by a spring body, only vibration energy in the same direction can be absorbed and consumed. Therefore, there is a problem that vibration cannot be sufficiently damped.

That is, vibration (including chatter vibration) during machining does not appear as vibration in one fixed direction, but appears as vibration in various directions or compound vibration made of vibration in several directions, which depends on the then environment and conditions. Therefore, the conventional center rest that is capable of absorbing and consuming vibration energy only in a predetermined one direction cannot sufficiently and appropriately reduce vibration occurring on a workpiece.

The present disclosure has been achieved in view of the above-described circumstances and an object thereof is to provide a damping apparatus capable of sufficiently and appropriately (i.e., effectively) reducing vibration of a workpiece held by a spindle of a machine tool for machining.

The present disclosure, for solving the above-described problem, relates to a damping apparatus disposed on a machine tool for reducing vibration of a workpiece held by a spindle of the machine tool, including:

a contact roller provided to be rotatable about a rotation axis;

a first support body supporting the contact roller in such a manner that the contact roller is rotatable;

a second support body supporting the first support body in such a manner that the rotation axis of the contact roller is parallel to an axis of the spindle;

a drive mechanism driving the second support body to bring the contact roller into contact with the workpiece held by the spindle and to separate the contact roller from the workpiece held by the spindle; and a base supporting the second support body and the drive mechanism, the first support body being held by the second support body via an elastic rubber body.

According to this damping apparatus, first, the second support body is driven by the drive mechanism with a workpiece being held by the spindle of the machine tool so that the contact roller is brought into contact with the workpiece held by the spindle.

Thereafter, the workpiece is machined in this state. Once vibration occurs on the workpiece, the vibration is propagated to the contact roller that is in contact with the workpiece. At this time, because the first support body supporting the contact roller is held by the second support via an elastic rubber body and the contact roller and the first support body therefore can be displaced in any direction by elastic deformation of the rubber body, energy of the vibration propagated to the contact roller is absorbed by elastic deformation of the rubber body corresponding to the direction of the vibration, and thereby damped. Therefore, even if chatter vibration occurs on the workpiece, the chatter vibration is absorbed by elastic deformation of the rubber body through the contact roller, and thereby damped.

In the present disclosure, the damping apparatus may further include a cylindrical outer ring and a cylindrical inner ring, which are concentrically disposed. In this case, the outer ring and the inner ring are connected to each other via the rubber body filled between them, and the first support body is connected to either one of the outer ring and the inner ring and the second support body is connected to the other of the outer ring and the inner ring.

Alternatively, in the damping apparatus including the outer ring and the inner ring, the second support body may have a support shaft inserted in the inner ring and the first support body may have an engagement hole in which the outer ring is inserted. In this case, the second support body is connected to the inner ring with the support shaft being inserted in the inner ring and the first support body is connected to the outer ring with the outer ring being inserted in the engagement hole.

In this structure composed of the outer ring, the inner ring and the rubber body filled between them, relative displacement of the outer ring and the inner ring caused by elastic deformation of the rubber body is possible in any direction in three-dimensional space. Therefore, the first support body and the second support body connected to each other via this structure can be relatively displaced in any direction in three-dimensional space by elastic deformation of the rubber body; consequently, energy of the vibration (including chatter vibration) propagated to the contact roller is absorbed by elastic deformation of the rubber body corresponding to the direction of the vibration, and thereby damped.

Further, in the present disclosure, it is preferred that the damping apparatus includes a moving mechanism moving the base along the axis of the spindle. For example, the position of vibration occurring on the workpiece during machining can vary with the shape of the workpiece or the like, and, in such a case, the contact roller has to be brought into contact with the position of occurrence of the vibration of the workpiece in order for the vibration to be effectively damped. In the configuration with the moving mechanism, the contact roller can be brought into contact with an appropriate damping position in accordance with the position of vibration of the workpiece by moving the base along the axis of the spindle, which enables more effective damping of vibration of the workpiece.

According to the damping apparatus of the present disclosure, because the first support body supporting the contact roller is held by the second support body via an elastic rubber body and the contact roller and the first support body therefore can be displaced in any direction by elastic deformation of the rubber body, when vibration occurs on the workpiece, energy of the vibration that is propagated to the contact roller due to the contact between the contact roller and the workpiece is effectively absorbed by elastic deformation of the rubber body corresponding to the direction of the vibration, and thereby damped. Therefore, even if chatter vibration occurs on the workpiece, the chatter vibration is absorbed by elastic deformation of the rubber body through the contact roller, and thereby damped more effectively as compared with the conventional center rest.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Hereinafter, a specific embodiment of the present disclosure will be described with reference to the drawings.

Figure 1:
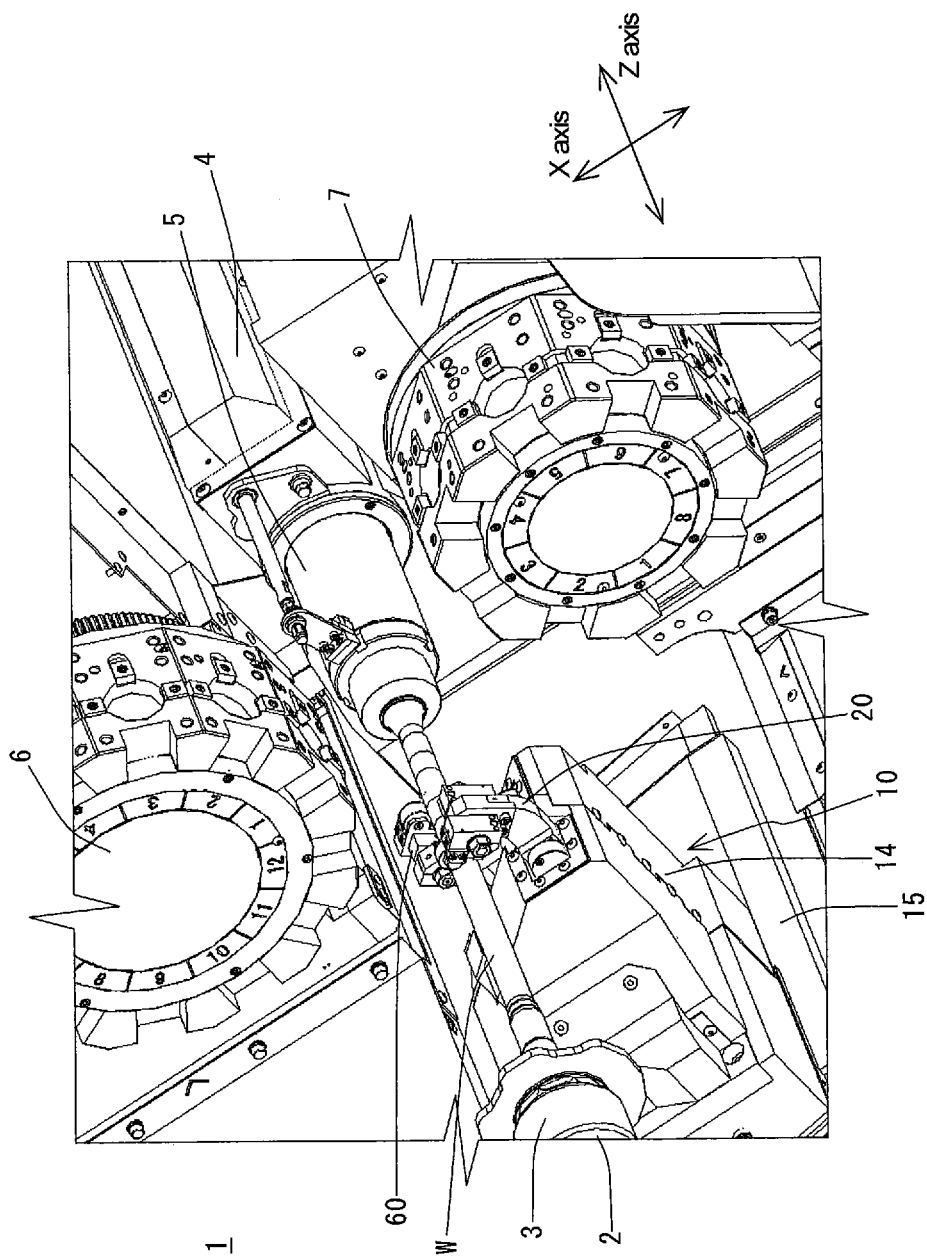
FIG. 1 is a perspective view showing a lathe having a damping apparatus according to an embodiment of the present disclosure.

As shown in FIG. 1, a damping apparatus 10 of the embodiment is disposed on a lathe 1. The lathe 1 includes a spindle 2, a chuck 3 fixed to the spindle 2, a tailstock 4 arranged to face the spindle 2, an upper tool rest 6, a lower tool rest 7, and other components. The tailstock 4 has a tailstock spindle 5, and an elongated workpiece W which is held by the chuck 3 is supported by the tailstock spindle 5 at the other end thereof. The tool rests 6 and 7 are movable in an X-axis direction orthogonal to an axis of the spindle 2 and in a Z-axis direction parallel to the axis of the spindle 2.

Note that the damping apparatus 10 of the present disclosure is applicable not only to the lathe 1 having the above-described configuration but also to lathes having a different configuration. Further, as a matter of course, the damping apparatus 10 is applicable also to machine tools other than a lathe, such as a grinding machine.

Figure 2:
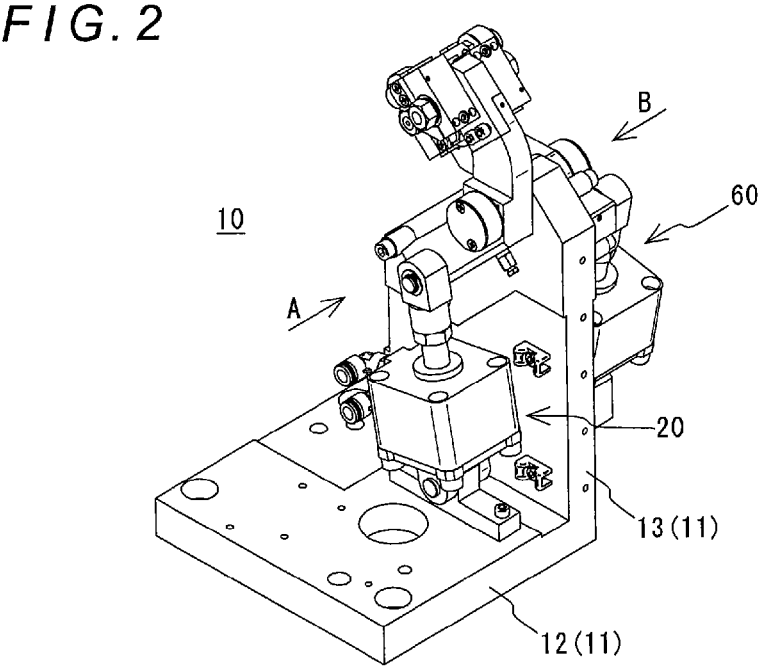
FIG. 2 is a perspective view showing the damping apparatus according to the embodiment.
Figure 3:
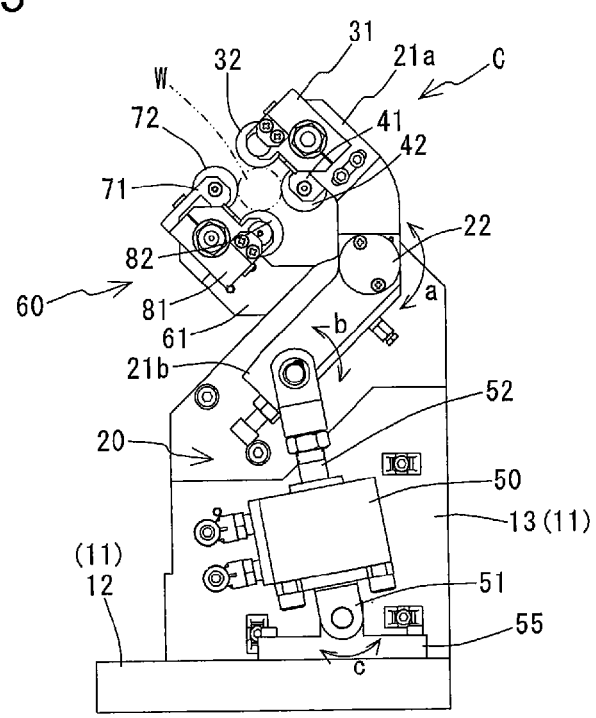
FIG. 3 is a side view as viewed in the arrow A direction in FIG. 2.
Figure 4:
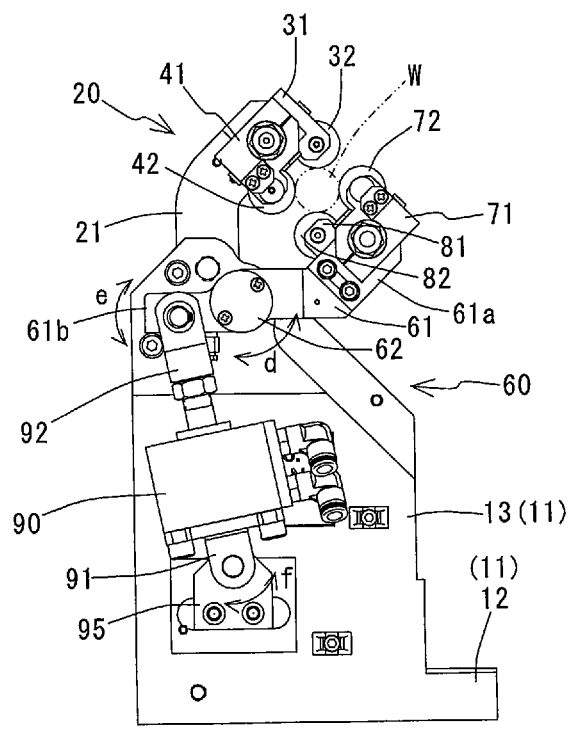
FIG. 4 is a side view as viewed in the arrow B direction in FIG. 2.

As shown in FIGS. 1 to 4, the damping apparatus 10 of this embodiment includes a base 11, two damping mechanisms 20 and 60 disposed on the base 11, a cover body 14 covering the base 11 and the damping mechanisms 20 and 60, a moving mechanism 15 for moving the base 11 in the Z-axis direction, and other components. Note that, in FIGS. 2 to 4, depiction of the cover body 14 is omitted and only the base 11 and the damping mechanisms 20 and 60 disposed on the base 11 are depicted. Each component is described in detail below.

Base 11 and Moving Mechanism 15

The base 11 is a member having an L-shape in front view, which consists of a horizontal portion 12 and a vertical portion 13 erected at one end of the horizontal portion 12; the base 11 is disposed on the lathe 1 so that the vertical portion 13 is orthogonal to the spindle axis. Further, the damping mechanism 20 is disposed on one side surface (surface located on the spindle 2 side) of the vertical portion 13, and the damping mechanism 60 is disposed on the other side surface.

Although the configuration of the moving mechanism 15 is not specifically shown in the drawings, the moving mechanism 15 includes, for example, a guide mechanism for guiding the movement of the base 11 in the Z-axis direction, a ball screw mechanism composed of a ball nut and a ball screw, and a servo motor rotating the ball screw. The ball screw is disposed along the Z-axis direction and the ball nut, which is engaged with the ball screw, is fixed on the base 11, and the base 11 is moved in the Z-axis direction by rotation of the ball screw rotated by the servo motor.

Damping Mechanisms 20 and 60

As shown in FIGS. 2 to 4, the damping mechanisms 20 and 60 are arranged in line symmetry with respect to an appropriate vertical axis. Some of their components (members) are different in shape or the like; however, they basically have the same configuration. The configuration of each of the damping mechanisms 20 and 60 is described below, though there may be many duplicate descriptions. Note that, in FIGS. 5 to 7, the configuration of the damping mechanism 20 is shown and the reference numerals indicating the corresponding components of the damping mechanism 60 are shown in parentheses.

a) Damping Mechanism 20

Figure 5:
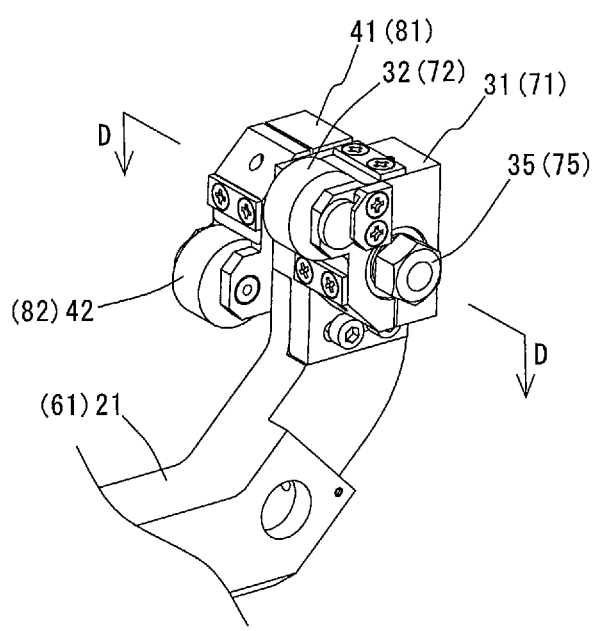
FIG. 5 is an enlarged perspective view showing the portion C in FIG. 3.

As shown in FIGS. 3 and 5, the damping mechanism 20 includes two contact rollers 32 and 42, a support member 31 by which the contact roller 32 is rotatably supported, a support member 41 by which the contact roller 42 is rotatably supported, a support arm 21 by which the support members 31 and 41 are supported, and a hydraulic cylinder 50 driving the support arm 21. Note that the support members 31 and 41 correspond to the first support body and the support arm 21 corresponds to the second support body.

The support arm 21 has a curved shape and is supported on the vertical portion 13 of the base 11 by a support shaft 22 at the curved portion thereof. Further, a lower end 21b of the support arm 21, one end of the support arm 21, is connected to a piston rod 52 of the hydraulic cylinder 50 by a connecting shaft, and an end 51 of the hydraulic cylinder 50, which is located at the opposite side from the piston rod 52, is similarly connected to a support member 55, which is fixed on the base 11, by a connecting shaft.

Thus, as shown in FIG. 3, a link structure is formed, in which the support arm 21 is pivotable in the arrow a directions about an axis of the support shaft 22, the lower end 21b of the support arm 21 and the piston rod 52 are relatively rotatable in the arrow b directions, and the end 51 of the hydraulic cylinder 50 and the support member 55 are relatively rotatable in the arrow c directions. In this structure, forward and backward movement of the piston rod 52 of the hydraulic cylinder 50 causes the support arm 21 to pivot in the arrow a directions. Note that the hydraulic cylinder 50 is supplied with appropriate pressure oil from a pressure oil supply, e.g., a hydraulic pump unit.

The support member 31 supporting the contact roller 32 is held on one side surface of an upper end 21a of the support arm 21, the other end of the support arm 21, and the support member 41 supporting the contact roller 42 is held on the other side surface. Note that the contact rollers 32 and 42 are supported by the support arm 21 so that their rotation axes are parallel to the axis of the spindle 2.

Figure 6:
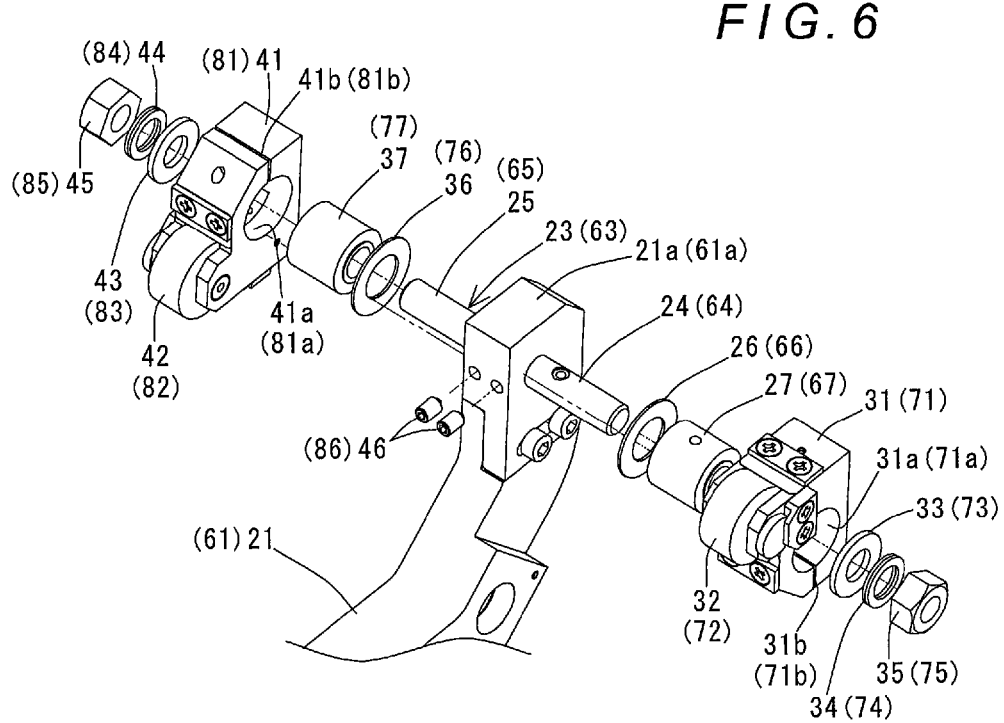
FIG. 6 is an exploded perspective view showing the portion C in FIG. 3.
Figure 7:
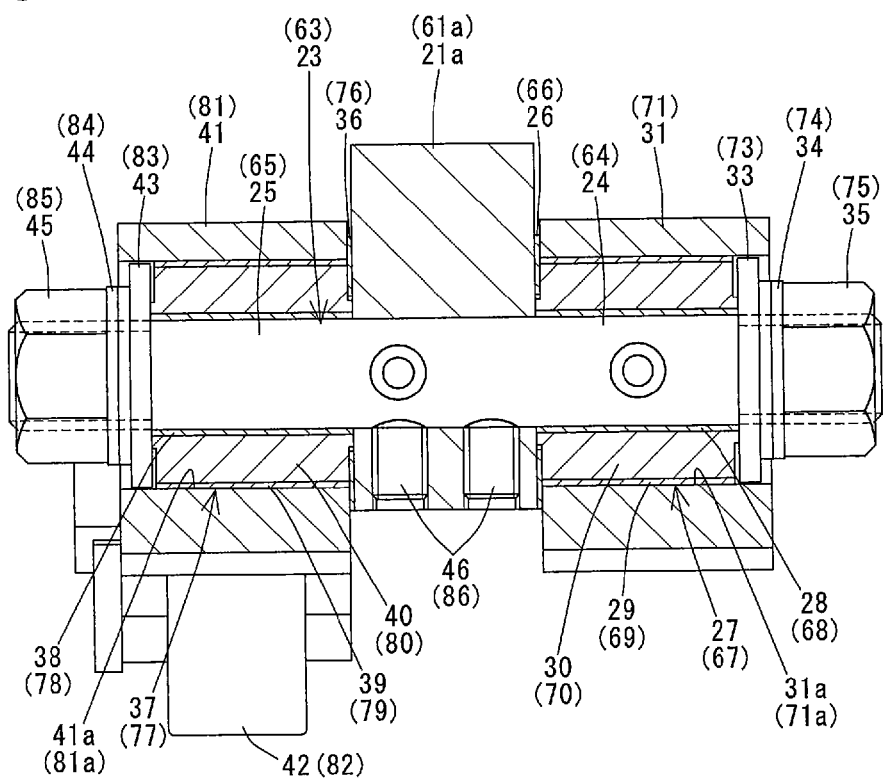
FIG. 7 is a sectional view taken along the arrows D-D in FIG. 5.

As shown in FIGS. 6 and 7, at the upper end 21a of the support arm 21, a support shaft 23 is provided to penetrate through the upper end 21a and protrude from both side surfaces of the upper end 21a; the support shaft 23 is fixed by machine screws 46. The support member 31 is connected to one side shaft 24 of the support shaft 23 via a damping bush 27, and the support member 41 is similarly connected to the other side shaft 25 of the support shaft 23 via a damping bush 37.

The damping bush 27 has a cylindrical inner ring 28 and a cylindrical outer ring 29, which are concentrically disposed, and has a configuration in which the inner ring 28 and the outer ring 29 are connected to each other via a rubber body 30 filled between them. Further, the support member 31 has an engagement hole 31a which is provided to be parallel to the rotation axis of the contact roller 32 and in which the damping bush 27 is inserted, and the engagement hole 31 has a slit groove 31b formed along the center axis thereof.

As shown in FIG. 6, a washer 26 and the damping bush 27 are put on the shaft 24 in this sequence, and then the support member 31 is fitted on the damping bush 27 and a washer 33 and a spring washer 34 are put on the shaft 24. Thereafter, a nut 35 is tightened on a screw formed at an end of the shaft 24, whereby the inner ring 28 of the damping bush 27 is pushed against the side surface of the support arm 21 and thereby connected to the support arm 21. Further, when, in this state, the inside width of the slit groove 31b of the support member 31 is narrowed by screwing a machine screw or the like, the outer ring 29 of the damping bush 27 is tightened by the support member 31 and the support member 31 and the outer ring 29 of the damping bush 27 are connected to each other by the tightening force.

Thus, the support member 31 holding the contact roller 32 is connected to the support arm 21 via the rubber body 30; therefore, the contact roller 32 and the support member 31, and the support arm 21 can be relatively displaced in any direction in three-dimensional space by elastic deformation of the rubber body 30.

On the other hand, the damping bush 37 also includes a cylindrical inner ring 38 and a cylindrical outer ring 39, which are concentrically disposed, and has a configuration in which the inner ring 38 and the outer ring 39 are connected to each other via a rubber body 40 filled between them.

Further, the support member 41 also has an engagement hole 41a which is provided to be parallel to the rotation axis of the contact roller 42 and in which the damping bush 37 is inserted, and the engagement hole 41a has a slit groove 41b formed along the center axis thereof.

Similarly, as shown in FIG. 6, a washer 36 and the damping bush 37 are put on the shaft 25 in this sequence, and then the support member 41 is fitted on the damping bush 37 and a washer 43 and a spring washer 44 are put on the shaft 25. Thereafter, a nut 45 is tightened on a screw formed at an end of the shaft 25, whereby the inner ring 38 of the damping bush 37 is pushed against the side surface of the support arm 21 and thereby connected to the support arm 21. Further, when, in this state, the inside width of the slit groove 41b of the support member 41 is narrowed by screwing a machine screw or the like, the outer ring 39 of the damping bush 37 is tightened by the support member 41 and the support member 41 and the outer ring 39 of the damping bush 37 are connected to each other by the tightening force.

Thus, a support member 41 holding the contact roller 42 is connected to the support arm 21 via the rubber body 40; therefore, the contact roller 42 and the support member 41, and the support arm 21 can be relatively displaced in any direction in three-dimensional space by elastic deformation of the rubber body 40.

Further, when the piston rod 52 of the hydraulic cylinder 50 is moved backward, the outer peripheral surfaces of the contact rollers 32 and 42 are pushed against the outer peripheral surface of the workpiece W supported by the chuck 3 and the tailstock 4 with an appropriate pushing force. Note that the pushing force with which the contact rollers 32 and 42 are pushed against the outer peripheral surface of the workpiece W is adjusted by adjusting the position to which the piston rod 52 is moved backward.

b) Damping Mechanism 60

As shown in FIG. 4, the damping mechanism 60 includes two contact rollers 72 and 82, a support member 71 by which the contact roller 72 is rotatably supported, a support member 81 by which the contact roller 82 is rotatably supported, a support arm 61 by which the support members 71 and 81 are supported, and a hydraulic cylinder 90 driving the support arm 21. Note that the support members 71 and 81 correspond to the first support body and the support arm 61 corresponds to the second support body.

The support arm 61 has a curved shape and is supported on the vertical portion 13 of the base 11 by a support shaft 62 at the curved portion thereof. Further, one end 61b of the support arm 61, is connected to a piston rod 92 of the hydraulic cylinder 90 by a connecting shaft, and an end 91 of the hydraulic cylinder 90, which is located at the opposite side from the piston rod 92, is similarly connected to a support member 95, which is fixed on the base 11, by a connecting shaft.

Thus, as shown in FIG. 4, a link structure is formed, in which the support arm 61 is pivotable in the arrow d directions about an axis of the support shaft 62, the one end 61b of the support arm 61 and the piston rod 92 are relatively rotatable in the arrow e directions, and the end 91 of the hydraulic cylinder 90 and the support member 95 are relatively rotatable in the arrow f directions. In this structure, forward and backward movement of the piston rod 92 of the hydraulic cylinder 90 causes the support arm 61 to pivot in the arrow d directions. Note that the hydraulic cylinder 90 is supplied with appropriate pressure oil from a pressure oil supply, e.g., a hydraulic pump unit.

The support member 71 supporting the contact roller 72 is held on one side surface of the other end 61a of the support arm 61, and the support member 81 supporting the contact roller 82 is held on the other side surface. Note that the contact rollers 72 and 82 are supported by the support arm 61 so that their rotation axes are parallel to the axis of the spindle 2.

As shown in FIGS. 6 and 7, at the upper end 61a of the support arm 61, a support shaft 63 is provided to penetrate through the upper end 61a and protrude from both side surfaces of the upper end 61a; the support shaft 63 is fixed by machine screws 86. The support member 71 is connected to one side shaft 64 of the support shaft 63 via a damping bush 67, and the support member 81 is similarly connected to the other side shaft 65 of the support shaft 63 via a damping bush 77.

The damping bush 67 has a cylindrical inner ring 68 and a cylindrical outer ring 69, which are concentrically disposed, and has a configuration in which the inner ring 68 and the outer ring 69 are connected to each other via a rubber body 70 filled between them. Further, the support member 71 has an engagement hole 71a which is provided to be parallel to the rotation axis of the contact roller 72 and in which the damping bush 67 is inserted, and the engagement hole 71a has a slit groove 71b formed along the center axis thereof.

As shown in FIG. 6, a washer 66 and the damping bush 67 are put on the shaft 64 in this sequence, and then the support member 71 is fitted on the damping bush 67 and a washer 73 and a spring washer 74 are put on the shaft 64. Thereafter, a nut 75 is tightened on a screw formed at an end of the shaft 64, whereby the inner ring 68 of the damping bush 67 is pushed against the side surface of the support arm 61 and thereby connected to the support arm 61. Further, when, in this state, the inside width of the slit groove 71b of the support member 71 is narrowed by screwing a machine screw or the like, the outer ring 69 of the damping bush 67 is tightened by the support member 71 and the support member 71 and the outer ring 69 of the damping bush 67 are connected to each other by the tightening force.

Thus, the support member 71 holding the contact roller 72 is connected to the support arm 61 via the rubber body 70; therefore, the contact roller 72 and the support member 71, and the support arm 61 can be relatively displaced in any direction in three-dimensional space by elastic deformation of the rubber body 70.

On the other hand, the damping bush 77 also includes a cylindrical inner ring 78 and a cylindrical outer ring 79, which are concentrically disposed, and has a configuration in which the inner ring 78 and the outer ring 79 are connected to each other via a rubber body 80 filled between them.

Further, the support member 81 also has an engagement hole 81a which is provided to be parallel to the rotation axis of the contact roller 82 and in which the damping bush 77 is inserted, and the engagement hole 81a has a slit groove 81b formed along the center axis thereof.

Similarly, as shown in FIG. 6, a washer 76 and the damping bush 77 are put on the shaft 65 in this sequence, and then the support member 81 is fitted on the damping bush 77 and a washer 83 and a spring washer 84 are put on the shaft 65. Thereafter, a nut 85 is tightened on a screw formed at an end of the shaft 65, whereby the inner ring 78 of the damping bush 77 is pushed against the side surface of the support arm 61 and thereby connected to the support arm 61. Further, when, in this state, the inside width of the slit groove 81b of the support member 81 is narrowed by screwing a machine screw or the like, the outer ring 79 of the damping bush 77 is tightened by the support member 81 and the support member 81 and the outer ring 79 of the damping bush 77 are connected to each other by the tightening force.

Thus, a support member 81 holding the contact roller 82 is connected to the support arm 61 via the rubber body 80; therefore, the contact roller 82 and the support member 81, and the support arm 61 can be relatively displaced in any direction in three-dimensional space by elastic deformation of the rubber body 80.

Further, when the piston rod 92 of the hydraulic cylinder 90 is moved backward, the outer peripheral surfaces of the contact rollers 72 and 82 are pushed against the outer peripheral surface of the workpiece W supported by the chuck 3 and the tailstock 4 with an appropriate pushing force. Note that the pushing force with which the contact rollers 72 and 82 are pushed against the outer peripheral surface of the workpiece W is adjusted by adjusting the position to which the piston rod 92 is moved backward.

According to the lathe 1 of this embodiment having the above-described configuration, a workpiece W is machined in the following manner. Note that the piston rod 52 of the hydraulic cylinder 50 of the damping mechanism 20 and the piston rod 92 of the hydraulic cylinder 90 of the damping mechanism 60 are each positioned at a forward end and the contact rollers 32 and 42 and the contact rollers 72 and 82 are each at a position away from the axis of the spindle 2.

First, the workpiece W is supported by the chuck 3 and the tailstock spindle 5. Thereafter, the base 11 is moved in the Z-axis direction by the moving mechanism 15 to a position such that the damping mechanisms 20 and 60 do not obstruct the machining and it is easy to absorb vibration occurring on the workpiece W (a position where vibration is likely to occur on the workpiece W, if possible).

Subsequently, the piston rod 52 of the hydraulic cylinder 50 of the damping mechanism 20 and the piston rod 92 of the hydraulic cylinder 90 of the damping mechanism 60 are moved backward to cause the contact rollers 31 and 42 and the contact rollers 71 and 82 to pivot toward the axis of the spindle 2, whereby the contact rollers 32 and 42 and the contact rollers 72 and 82 are brought into contact with the outer peripheral surface of the workpiece W with a predetermined pushing force.

After the contact rollers 32 and 42 and the contact rollers 72 and 82 are brought into contact with the outer peripheral surface of the workpiece W with a predetermined pushing force in the above-described manner, the workpiece W is machined by the lathe 1.

Once vibration occurs on the workpiece W during the machining, the vibration is propagated to the contact rollers 32, 42, 72, and 82 that are in contact with the workpiece W. At this time, energy of the vibration propagated to the contact rollers 32, 42, 72, and 82 is certainly absorbed by elastic deformation of the rubber bodies 30, 40, 70, and 80 corresponding to the direction of the vibration and thereby damped because the contact rollers 32, 42, 72, and 82 are connected to the damping bushes 27, 37, 67, and 77, respectively, and the inner rings 28, 38, 68, and 78 and the outer rings 29, 39, 69, and 79 of the damping bushes 27, 37, 67, and 77 therefore can be relatively displaced in any direction in three-dimensional space by elastic deformation of the rubber bodies 30, 40, 70, and 80.

Thus, according to the damping apparatus 10 of this embodiment, even if complex and large vibration, such as chatter vibration, occurs on the workpiece W during machining, the vibration can be certainly absorbed by elastic deformation of the rubber bodies 30, 40, 70, and 80, and thereby damped.

Further, according to the damping apparatus 10 of this embodiment, the base 1 can be moved along the axis of the spindle 2 by the moving mechanism 15; therefore, the contact rollers 32, 42, 72, and 82 can be brought into contact with appropriate damping positions in accordance with the position of vibration of the workpiece W, which makes it possible to more effectively damp vibration of the workpiece W.

A specific embodiment of the present disclosure has been described above; however, the present disclosure is not limited thereto and may be implemented in other modes.

For example, although, in the above embodiment, four contact rollers 32, 42, 72, and 82 are provided, the disclosure is not limited thereto and the requirement is that at least one contact roller is provided.

Further, although, in the above embodiment, the support members 31 and 41 supporting the contact rollers 32 and 42 are connected to the support arm 21 by using the damping bushes 27 and 37 and the support members 71 and 81 supporting the contact rollers 72 and 82 are connected to the support arm 61 by using the damping bushes 67 and 77, the present disclosure is not limited to this configuration. The requirement is that the support members 31 and 41 and the support members 71 and 81 are connected to the support arm 21 and the support arm 61 via a rubber body, respectively, and the connection structure is not limited to the above-described structure of the damping bushes 27, 37, 67, and 77.

What is claimed is:

1. A damping apparatus disposed on a machine tool for reducing vibration of a workpiece held by a spindle of the machine tool, comprising:
   a contact roller provided to be rotatable about a rotation axis;
   a first support body supporting the contact roller in such a manner that the contact roller is rotatable;
   a second support body holding the first support body in such a manner that the rotation axis of the contact roller is parallel to an axis of the spindle;
   a drive mechanism driving the second support body to bring the contact roller into contact with the workpiece held by the spindle and to separate the contact roller from the workpiece held by the spindle; and
   a base supporting the second support body and the drive mechanism,
   the damping apparatus further comprising a cylindrical outer ring and a cylindrical inner ring,
   the outer ring and the inner ring being concentrically disposed and being connected to each other via a rubber body filled between the outer ring and the inner ring,
   the second support body having a support shaft inserted in the inner ring,
   the first support body having an engagement hole for inserting the outer ring therein,
   the second support body being connected to the inner ring with the support shaft being inserted in the inner ring, and
   the first support body being connected to the outer ring with the outer ring being inserted in the engagement hole.

2. The damping apparatus according to claim 1, further comprising a moving mechanism moving the base along the axis of the spindle.

* * * * *